(12) United States Patent
McWilliams et al.

(10) Patent No.: US 6,772,299 B2
(45) Date of Patent: Aug. 3, 2004

(54) METHOD AND APPARATUS FOR CACHING WITH VARIABLE SIZE LOCKING REGIONS

(75) Inventors: Thomas M. McWilliams, Menlo Park, CA (US); Earl T. Cohen, Fremont, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 261 days.

(21) Appl. No.: 10/141,249

(22) Filed: May 8, 2002

(65) Prior Publication Data

US 2003/0018855 A1 Jan. 23, 2003

Related U.S. Application Data

(60) Provisional application No. 60/306,122, filed on Jul. 16, 2001.

(51) Int. Cl.[7] .............................................. G06F 12/00
(52) U.S. Cl. ....................... 711/145; 711/154; 711/159; 711/163; 711/129; 711/133
(58) Field of Search ................................ 711/145, 154, 711/159, 163, 129, 133

(56) References Cited

U.S. PATENT DOCUMENTS

| | | | | | |
|---|---|---|---|---|---|
| 5,630,097 | A | * | 5/1997 | Orbits et al. ................. | 711/165 |
| 5,875,464 | A | * | 2/1999 | Kirk ............................ | 711/129 |
| 6,292,705 | B1 | * | 9/2001 | Wang et al. .................... | 700/5 |
| 6,370,622 | B1 | * | 4/2002 | Chiou et al. ................. | 711/146 |
| 6,449,699 | B2 | * | 9/2002 | Franke et al. ................ | 711/147 |
| 6,516,442 | B1 | * | 2/2003 | Wang et al. .................. | 714/776 |
| 6,542,926 | B2 | * | 4/2003 | Zalewski et al. ............ | 709/213 |
| 6,629,207 | B1 | * | 9/2003 | Yoshioka et al. ............ | 711/125 |
| 6,681,296 | B2 | * | 1/2004 | Liao et al. ................... | 711/129 |

FOREIGN PATENT DOCUMENTS

| | | | | |
|---|---|---|---|---|
| EP | 1182567 A1 | * | 2/2002 | G06F/12/08 |

OTHER PUBLICATIONS

Maki et al., "A Data–Replace–Controlled Cache Memory System and its Performance Evaluations," pp 471–474, IEEE, Sep. 1999.*

Sivasubramaniam, "Reducing the Communication Overhead of Dynamic Applications on Shared Memory Multiprocessors," pp 194–203, IEEE, Feb. 1997.*

Soderquist et al., "Optimizing the Data Cache Performance of a Software MPEG–2 Video Decoder," pp 291–474, ACM, Nov. 1997.*

Fujitsu Microelectronics, Inc. Brochure; "*SPARClite Series 32–Bit RISC Embedded Processor*;" Copyright 1998, pp. 1–53; Fujitsu Microelectronics, Inc., San Jose, California, USA.

* cited by examiner

*Primary Examiner*—Matthew Kim
*Assistant Examiner*—Stephen Elmore
(74) *Attorney, Agent, or Firm*—Osha & May L.L.P.

(57) ABSTRACT

A method of managing data in a cache memory includes mapping a member of a plurality of memory addresses in a main memory onto a first member of a plurality of cache lines, locking the first member of the plurality of cache lines creating a locked cache region and an unlocked cache region, remapping the member of the plurality of memory addresses from the first member of the plurality of cache lines onto a second member of the plurality of cache lines within the unlocked cache region, requesting data stored in the main memory, fetching the data from the locked cache region, if available in the locked cache region, fetching the data from the unlocked cache region, if not available in the locked cache region and available in the unlocked cache region, and fetching the data from the main memory, if not available in the locked cache region and not available in the unlocked cache region.

27 Claims, 10 Drawing Sheets

METHOD AND APPARATUS FOR CACHING WITH VARIABLE SIZE LOCKING REGIONS

CROSS-REFERENCE TO RELATED APPLICATIONS

This application claims benefit of U.S. Provisional Application Serial No. 60/306,122, filed Jul. 16, 2001, entitled "Method and Apparatus For Caching With Variable Size Locking Regions," in the names of Thomas M. McWilliams and Earl T. Cohen.

BACKGROUND OF INVENTION

In a computer system, the central processing unit (CPU) processes information that is stored in a main memory (RAM or DRAM) within the computer. Typically, the CPU processes the information faster than the information can be accessed and transferred from the main memory to the CPU. As a result, when the CPU requests the information from the main memory, the CPU may remain idle for a substantial time while waiting for the information.

To reduce the amount of time the CPU remains idle, a fast but typically expensive type of memory is used as a cache. The cache is an intermediary storage area between the CPU and the main memory in order to store recently or frequently used information. Access times for the cache are typically substantially faster than access times for the main memory. However, the cache is substantially more costly than the main memory. Therefore, for cost effectiveness, the cache is often utilized in smaller sizes, relative to the less costly main memory.

FIG. 1 illustrates a generic cache mechanism in a computer, including a CPU (10), a main memory (12), a cache (14), and a data bus (16). The data bus (16) provides a means for transferring information between the main memory (12) and the CPU (10). As noted earlier, it is desirable for the CPU (10) to access the information as fast as possible. Therefore, when a piece of information is requested by the CPU (10), the cache (14) is searched for the piece of information first. If the piece of information is stored in the cache (14), then the piece information is quickly provided to the CPU (10). Otherwise, the piece of information is retrieved from the (relatively slower) main memory (12) and provided to the CPU (10). Also, the piece of information is stored in the cache (14), so that next time the piece of information is requested, the piece of information can be accessed quickly from the cache (14).

The granularity of storage in a cache is called a line. A cache line is a collection of bytes, generally at sequential memory locations, which are stored as a unit in the cache. Transfers between a main memory and the cache are usually accomplished via cache line granularity (i.e., one or more cache lines at a time).

When information requested is not found in the cache, a "cache miss" occurs. Conversely, if the information is found, there is a "cache hit." Due to the limited size of the cache, information stored in the cache may need to be replaced or swapped out, in order to make room for newly requested information that is not stored in the cache. Various cache mechanisms have been developed with an objective to maximize caching efficiency using methods or cache architectures that result in a low volume of cache misses and/or cache swaps.

Two currently used cache mechanisms are an associative cache, and a direct-mapped cache. The direct-mapped cache is effective and relatively inexpensive, in comparison to the associative cache. Sometimes, one or more locations in cache memory (i.e., cache lines) may be "locked," in order to avoid a set of information from being swapped out. A traditional direct-mapped cache mechanism may become less effective when used in a locking scenario because a locked cache line prohibits a portion of memory from being present in the cache. Some associative caches, however, can more effectively operate in a locking scenario, due to a more complex design. Therefore, when locking is required in a design architecture, a more complex and expensive associative cache mechanism may be preferred. Due to a relatively simple design, a direct-mapped cache can often be economically developed and manufactured.

An associative cache includes a number of information storage locations called cache lines. In addition to information retrieved from the main memory, each cache line of an associative cache typically includes a tag bit that indicates whether a particular cache line contains any information at all. FIG. 2, for example, illustrates an associative cache (15), having cache line (30A) through cache line (30Z) that correspond to the main memory (12), including multiple memory blocks (38A) through (38Z). Each memory block represents a unique main memory address. Each cache line can reference one or more memory addresses, depending on cache design.

Typically, when a computer is reset, each tag bit in a cache is set to 0, for example, to indicate that no cache lines are in use. Each time the CPU (10) makes a memory request, one or more cache lines is filled with data, and tag bits for the cache lines that are filled with data are changed to 1, for example, to indicate that the cache lines are in use. For example, referring to FIG. 2, if the CPU (10) makes a request for information stored at memory block (38A) in the main memory (12), a search is performed to determine whether any used cache lines in the associative cache (15) include the information requested by the CPU (10). Failing to find the information, a bus request is issued to fetch the information stored in memory block (38A) from the main memory (12), and store the information in an unused cache line in the associative cache (15). In the associative cache (15), cache lines may be filled in random order.

If information stored in the memory block (38A) is needed later, the information is quickly fetched from the associative cache (15), eliminating the need for a bus operation across the data bus (16) to fetch the information from the (relatively slower) main memory (12). Eventually, more cache lines are filled with data from the main memory (12), as the CPU (10) continues to request retrieval of additional information. If information needed by the CPU (10) appears in the associative cache (15), the CPU (10) can access the information from the associative cache (15) quickly, without making any memory references.

However, when the associative cache (15) is full, a previous cache entry i.e., information stored in a used cache line) is discarded to make room for a new entry from the main memory (12). In order to avoid performing a linear search on cache lines, an associative cache has special hardware that can search each cache line simultaneously for requested information. However, the special hardware makes the associative cache relatively costly.

A direct-mapped cache is a relatively less costly alternative to the associative cache, in that the direct-mapped cache avoids use of special hardware, by storing information in a cache line that is directly associated with a memory block from which the information is retrieved. For example, referring to the associative cache (15) illustrated in FIG. 2, the cache line (30) may be directly associated with the memory block (38). Accordingly, if the CPU (10) requests information stored at the memory block (38), the information can be retrieved directly from the cache line (30) associated with the memory block (38).

Alternatively, more than one memory block may be associated with (i.e., mapped to) a cache line. For example, if the main memory includes a 4×4 memory block pattern for a total of 16 memory blocks, a cache with four cache lines may suffice to directly map a group of four memory blocks into each cache line. Direct-mapped caching has a one-to-one association between groups of memory blocks and cache lines. Even though a cache line may be associated with more than one memory block, the cache line can only store information retained in one memory block at a time. Thus, when multiple memory blocks map onto a particular cache line, determining which memory block is currently occupying the particular cache line is impossible. Thus, each cache line also includes a tag field that can be used to identify the particular memory block currently stored in the cache line. The tag field can be represented by a binary number, for example.

FIG. 3 illustrates a direct-mapped cache (17) associated with a main memory (12). Memory block (38A) through memory block (38D) are mapped to cache line (30A), memory block (38E) through memory block (38H) are mapped to cache line (30B), and so on. If the CPU (10) requests information in memory block (38B), then cache line (30A) is targeted, as memory block (38A) through memory block (38D) are cached onto cache line (30A). A binary tag field, such as "00","01","10", or "11" can be used to denote which of the four memory blocks (memory block (38A) through memory block (38D)) are currently stored in cache line (30A), if any. For example, field "00" may denote that cache line (30A) references information currently stored in memory block (38A). Depending on the particular size of a particular cache line or main memory size, the tag field may vary in width. A tag field with a larger number of bits can be used to distinguish between a larger number of memory blocks.

Collision occurs with direct-mapped caches when multiple memory blocks that map onto a particular cache line collide. Collision, in this context, refers to a scenario where memory block addresses referencing currently requested information happen to map to the same particular cache line. For example, referring to FIG. 3, consider a scenario in which the CPU (10) requests information stored in memory block (38A) and memory block (38B) simultaneously. Both memory block (38A) and memory block (38B) map onto cache line (30A). Thus, there is sufficient room for only one of the memory block (38A) or memory block (38B) to be fetched into the direct-mapped cache (17), and not both. Excessive collision can substantially degrade the performance of cache memory. Therefore, alternative cache designs, such as those discussed below, have been implemented.

To minimize collision between memory addresses that map onto the same cache line, a direct-mapped cache can be expanded to include more than one entry per cache line. A direct-mapped cache with multiple entries per cache line is called a "set associative cache." A set associative cache is a hybrid between the direct mapped cache and the associative cache, in that a set associative cache supports direct mapping, but also requires additional hardware to quickly search multiple entries in a cache line.

FIG. 4 illustrates a set associative cache that has two entries per cache line. For example, in set associative cache (80), cache line (30A) has two entries: entry (90) and entry (92). Cache line (30B) through cache line (30Z) have entry (94) though entry (108). In a set associative cache, such as illustrated in FIG. 4, a collision is avoided even when requested information is stored in memory blocks mapped onto a particular cache line because each cache line includes an additional entry to accommodate the storage of more than one set of information.

For various reasons, including efficiency and predictability, maintaining certain data in cache memory in fixed, easily accessible locations is desirable. For example, one or more cache lines in a cache memory may be exclusively dedicated to or "locked" with data that are used often, which allows for fast and predictable access to the data. Therefore, processing efficiency is increased, because a need for exhaustive searching of cache memory prior to retrieval of information is eliminated. Thus, a portion of cache memory is converted into local memory for a CPU. Usually, cache locking is done by a programmer based on a detailed knowledge of a program's access patterns. For example, a signal processing program in which a fixed filter is applied to a large body of data may involve using filter coefficients of the fixed filter that are used often by the program, whereas the data are used less often. Sharpening filters for image processing, often uses a fixed filter and filter coefficients, such as described above, often. Where sharpening filters are used as described above, data memory is usually much larger than cache memory, so therefore there is typically little long-term locality of access. Thus, locking the filter coefficients in place can produce a large speedup.

A notable aspect of locking schemes is that the locking scheme may reduce cache storage capacity, because a locked region of cache memory may become inaccessible for swapping information to and from main memory. Specifically, when the locking scheme is applied to a direct-mapped cache, the locking scheme creates a repeating "hole" in the particular block of main memory that is mapped onto the particular cache lines that are locked. For example, referring to the direct-mapped cache illustrated in FIG. 3, if cache line (30A) and cache line (30B) are locked, then a cache request for information residing in memory block (38A) through memory block (38D), and memory block (38E) through memory block (38H) is rendered "illegal" because cache line (30A) and cache line (30B) are locked to prevent current information stored there from being swapped out. This scenario has a low cache hit rate and may lower caching efficiency, especially if information stored in the hole (i.e., memory block (38A) through memory block (38D) and memory block (38E) through memory block (38H)) is frequently needed.

Many circuit designers have abandoned the use of direct-mapped caches in favor of set associative caches in scenarios where cache line locking is needed. Because a set associative cache includes more than one set of entries per cache line, one set of the entries can be used to lock necessary information, and the other sets can be used for caching memory information. However, due to overhead and costs associated with design and manufacture of set associative caches, set associative caches are often relatively more expensive than direct-mapped caches.

SUMMARY OF INVENTION

In general, in one aspect, the invention relates to a method of managing data in a cache memory. The method comprises mapping a member of a plurality of memory addresses in a main memory onto a first member of a plurality of cache lines, locking the first member of the plurality of cache lines creating a locked cache region and an unlocked cache region, remapping the member of the plurality of memory addresses from the first member of the plurality of cache lines onto a second member of the plurality of cache lines within the unlocked cache region, requesting data stored in the main memory, fetching the data from the locked cache region, if available in the locked cache region, fetching the data from the unlocked cache region, if not available in the locked cache region and available in the unlocked cache region, and fetching the data from the main memory, if not available in the locked cache region and not available in the unlocked cache region.

In general, in one aspect, the invention relates to a method of managing data in a cache memory. The method comprises mapping a member of a plurality of memory addresses in a main memory onto a first member of a plurality of cache lines, locking the first member of the plurality of cache lines creating a locked cache region and an unlocked cache region, remapping the member of the plurality of memory addresses from the first member of the plurality of cache lines onto a second member of the plurality of cache lines within the unlocked cache region, requesting data stored in the main memory, fetching the data from the locked cache region, if available in the locked cache region, fetching the data from the unlocked cache region, if not available in the locked cache region and available in the unlocked cache region, fetching the data from the main memory, if not available in the locked cache region and not available in the unlocked cache region, detecting whether the data is within the unlocked cache region, using a register that maintains a size of the unlocked cache region, and associating with the second member of the plurality of cache lines, a tag field to identify information stored in the second member of the plurality of cache lines.

In general, in one aspect, the invention relates to a cache memory management system. The cache memory management system comprises a main memory comprising a plurality of memory addresses, and a cache memory comprising a plurality of cache lines, the plurality of cache lines comprising a locked cache region and an unlocked cache region, wherein a member of the plurality of memory addresses is mapped onto a first member of the plurality of cache lines, wherein the member of the plurality of memory addresses is configured to remap from the first member of the plurality of cache lines onto a second member of the plurality of cache lines, wherein the first member of the plurality of cache lines is within the locked cache region, and the second member of the plurality of cache lines is within the unlocked cache region.

In general, in one aspect, the invention relates to a cache memory management system. The cache memory management system comprises a main memory comprising a plurality of memory addresses, a cache memory comprising a plurality of cache lines, the cache memory comprising a locked cache region and an unlocked cache region, a register maintaining a size of the unlocked cache region, and an address detection mechanism configured to detect whether a referenced member of the plurality of memory addresses is within the locked cache region, wherein a member of the plurality of memory addresses is mapped onto a first member of the plurality of cache lines, wherein the member of the plurality of memory addresses is configured to remap from the first member of the plurality of cache lines onto a second member of the plurality of cache lines, wherein the first member of the plurality of cache lines is within the locked cache region, and the second member of the plurality of cache lines is within the unlocked cache region.

In general, in one aspect, the invention relates to a computer system for managing data in a cache memory. The computer system comprises a processor, a memory, software instructions stored in the memory to cause the computer system to perform mapping a member of a plurality of memory addresses in a main memory onto a first member of a plurality of cache lines, locking the first member of the plurality of cache lines creating a locked cache region and an unlocked cache region, remapping the member of the plurality of memory addresses from the first member of the plurality of cache lines onto a second member of the plurality of cache lines within the unlocked cache region, requesting data stored in the main memory, fetching the data from the locked cache region, if available in the locked cache region, fetching the data from the unlocked cache region, if not available in the locked cache region and available in the unlocked cache region, and fetching the data from the main memory, if not available in the locked cache region and not available in the unlocked cache region.

In general, in one aspect, the invention relates to an apparatus managing data in a cache memory. The apparatus comprises means for mapping a member of a plurality of memory addresses in a main memory onto a first member of a plurality of cache lines, means for locking the first member of the plurality of cache lines creating a locked cache region and an unlocked cache region, means for remapping the member of the plurality of memory addresses from the first member of the plurality of cache lines onto a second member of the plurality of cache lines within the unlocked cache region, means for requesting data stored in the main memory, fetching the data from the locked cache region, if available in the locked cache region, means for fetching the data from the unlocked cache region, if not available in the locked cache region and available in the unlocked cache region, and means for fetching the data from the main memory, if not available in the locked cache region and not available in the unlocked cache region.

Other aspects and advantages of the invention will be apparent from the following description and the appended claims.

DETAILED DESCRIPTION

Figure 1:
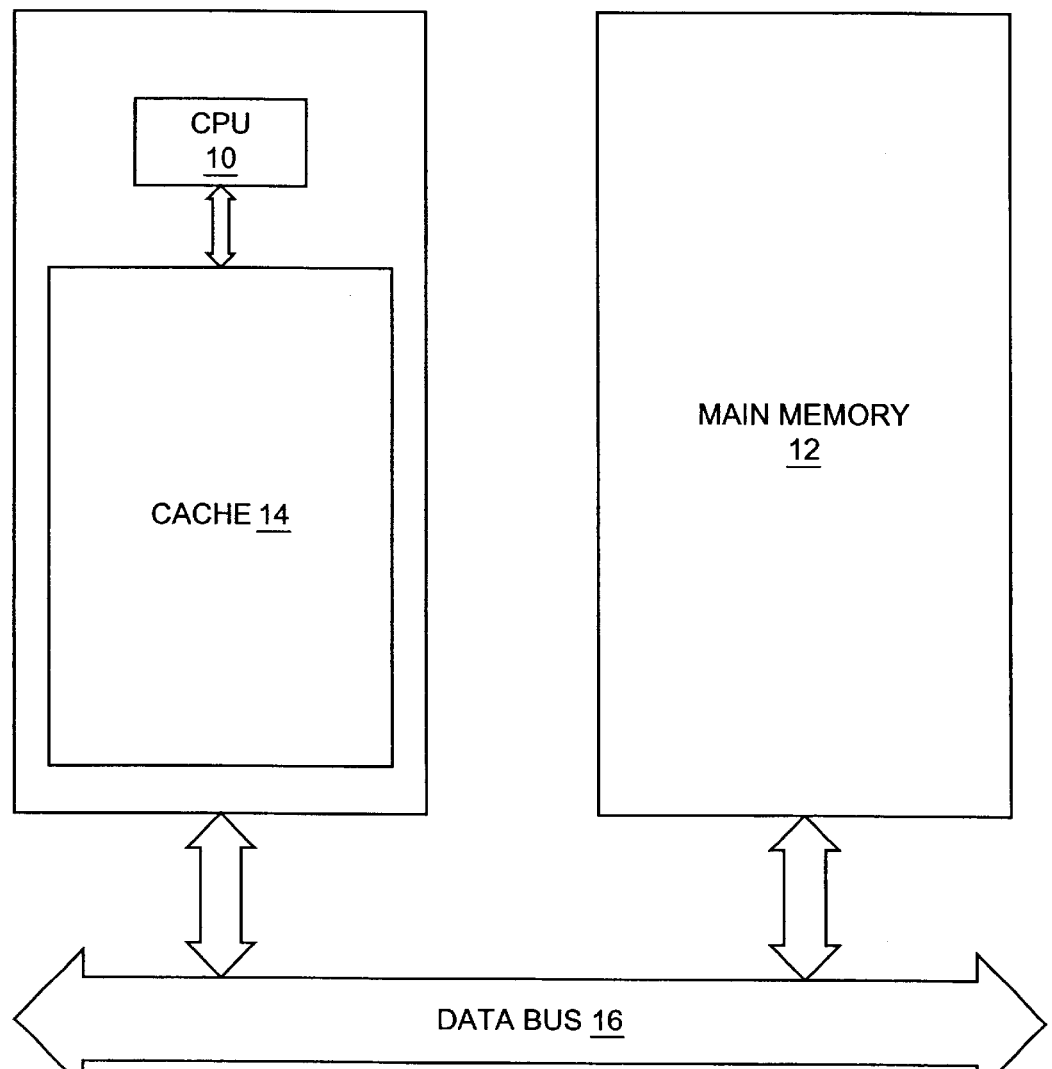
FIG. 1 illustrates a generic cache mechanism.
Figure 2:
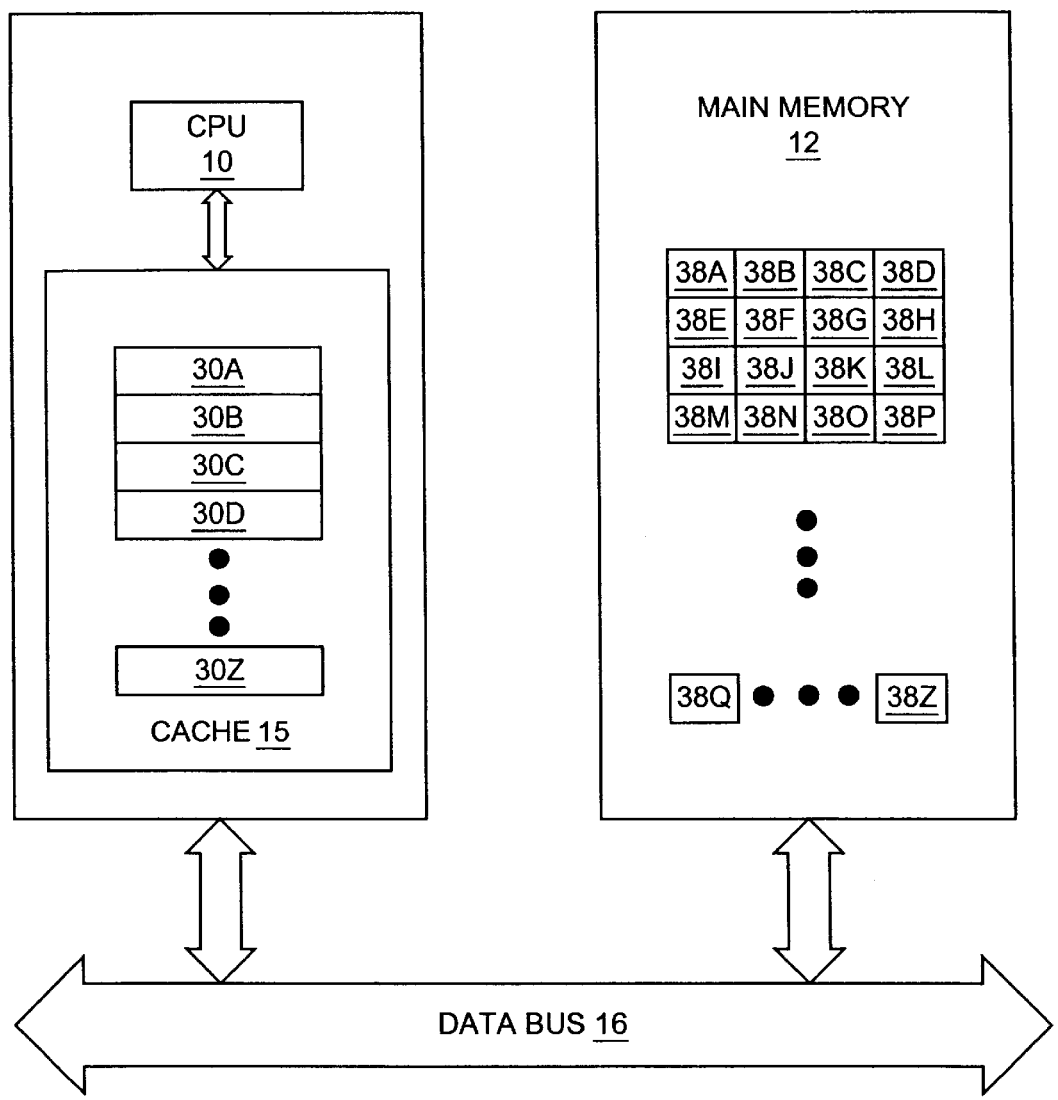
FIG. 2 illustrates an associative cache mechanism.
Figure 3:
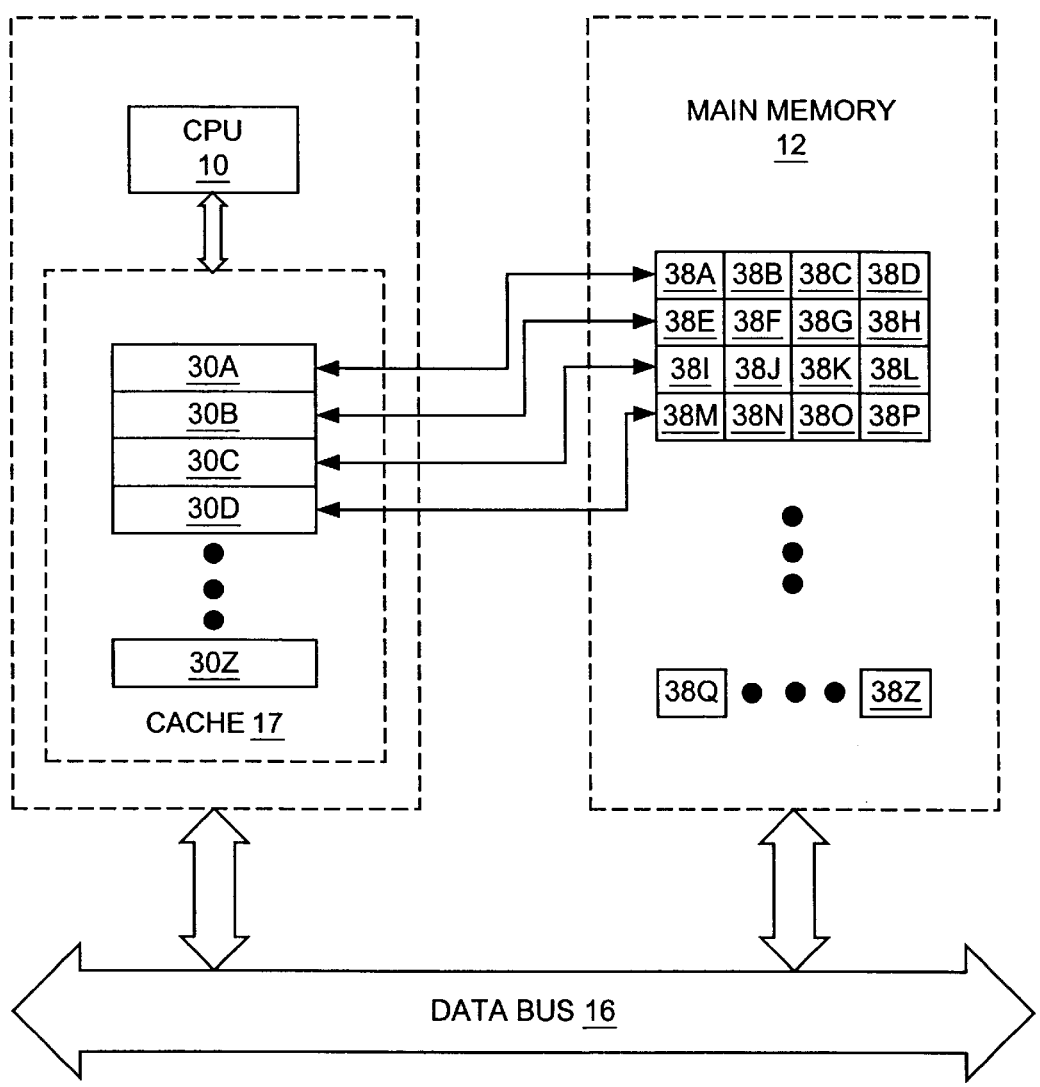
FIG. 3 illustrates a direct-mapped cache mechanism.
Figure 4:
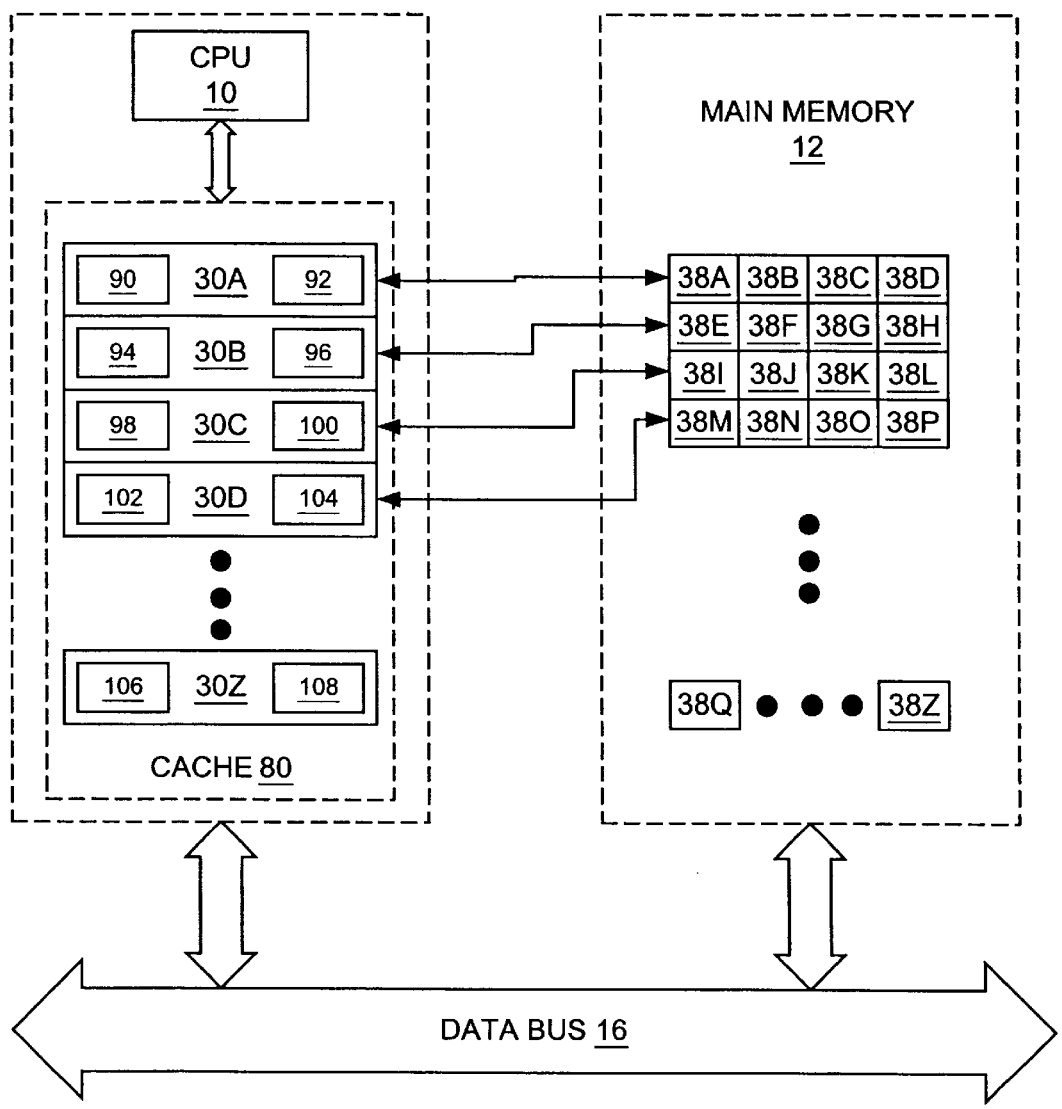
FIG. 4 illustrates a set associative cache mechanism.
Figure 5:
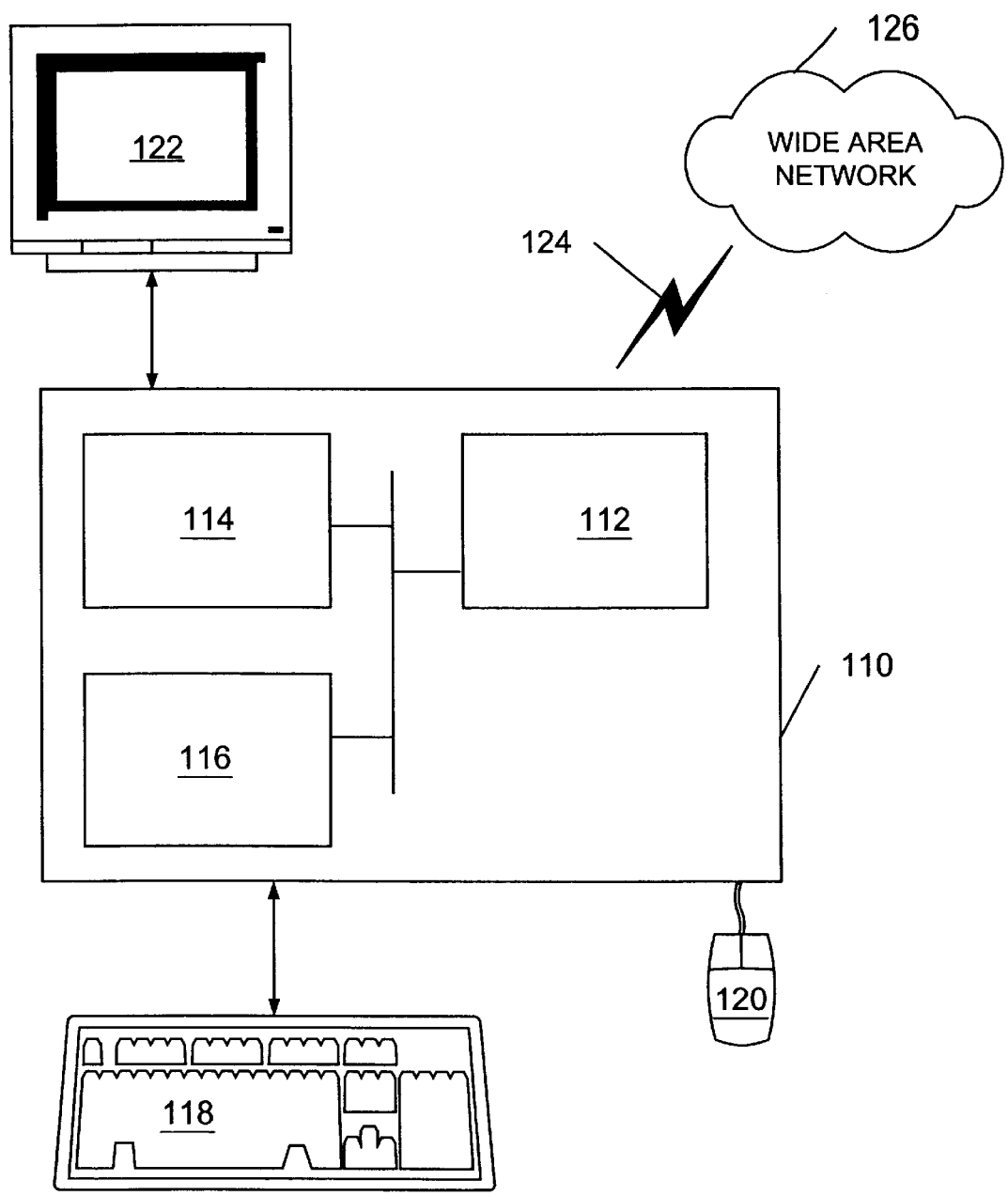
FIG. 5 illustrates a typical networked computer system.

The invention may be implemented on virtually any type computer regardless of the platform being used. For example, as shown in FIG. 5, a typical computer (110) includes a processor (112), an associated memory (114), a age device (116), and numerous other elements and functionalities typical of today's computers (not shown). The computer (110) may also include input means, such as a keyboard (118) and a mouse (120), and an output device, such as a monitor (122). Those skilled in the art will appreciate that these input and output means may take other forms in an accessible environment. The computer (110) is connected via a network connection (124) to a Wide Area Network (WAN) (126), such as the Internet.

In the following description, numerous specific details are set forth in order provide a more thorough understanding of the present invention. It will be apparent, however, to one skilled in the art that the invention may be practiced without these specific details. However, in order not to unnecessarily obscure the invention, all various implementations or alternate embodiments including well-known features of the invention may have not been described in detail herein.

The invention relates to a method and apparatus for the adjustable locking of a region of memory of a cache such that memory blocks (representing main memory addresses) maintain a mapping onto a unlocked region of the cache. The mapping provides an association between addresses in the main memory and the cache for quick reference.

Figure 6:
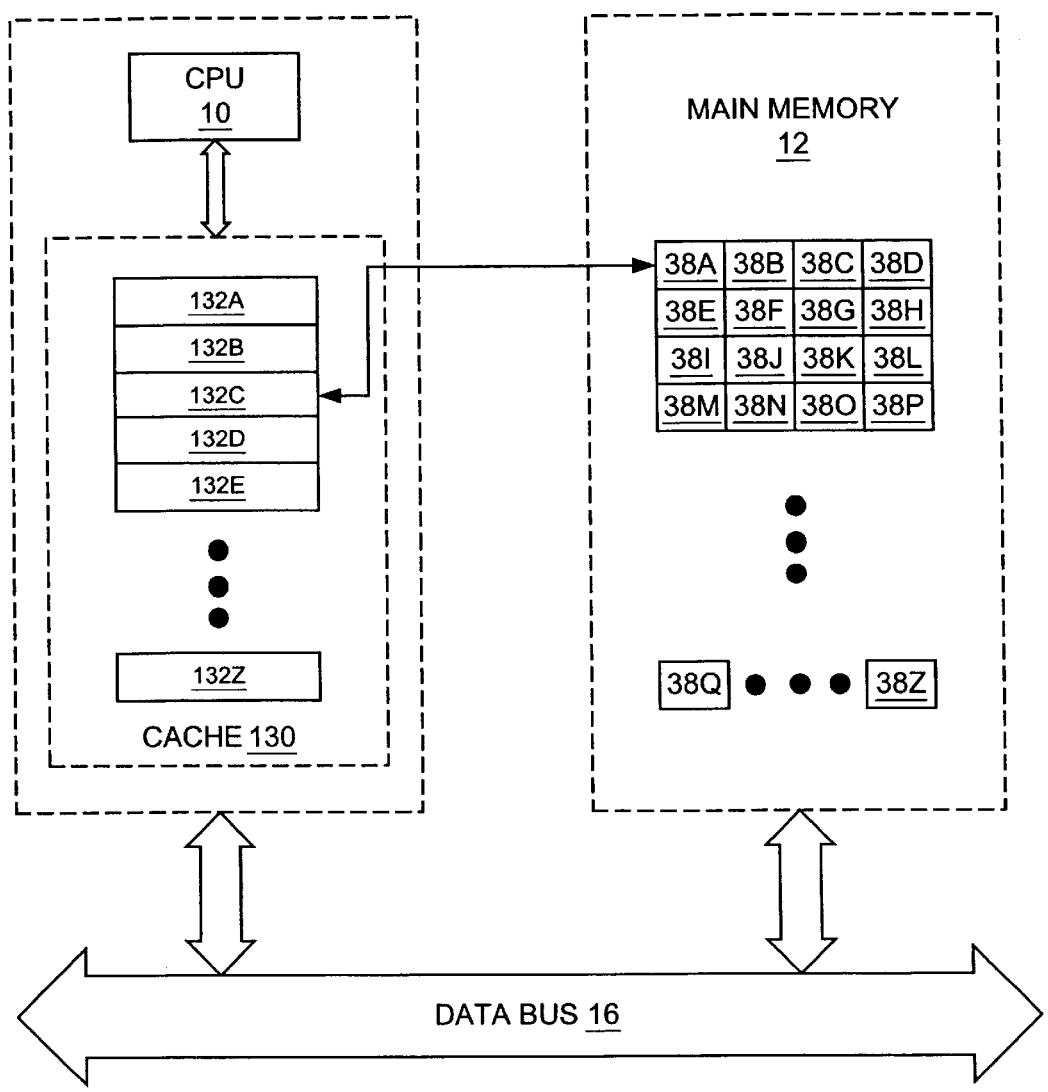
FIG. 6 illustrates a caching mechanism, in accordance with one or more embodiments of the invention.

FIG. 6 illustrates a caching mechanism, in accordance with one or more embodiments of the invention. Components include a CPU (10), a main memory (12), a cache (130), and a data bus (16). One skilled in the art will recognize that multiple CPU's (i.e., processors) may be involved in one or more embodiments of he invention.

The cache (130) includes multiple cache lines, such as cache line (132A) through cache line (132Z). Each cache line is associated with one or more memory blocks (i.e., memory block (38A) through memory block (38Z)) in the main memory (12), and is capable of referencing information stored in the main memory (12). In accordance with one or more embodiments of the invention, blocks of main memory including, for example, memory block (38A) through memory block (38D) are directly mapped onto a particular cache line in the cache (130), for example cache line (132C). Thus, all or a portion of the main memory (12) is mapped onto individual cache lines in the cache (130).

Figure 7:
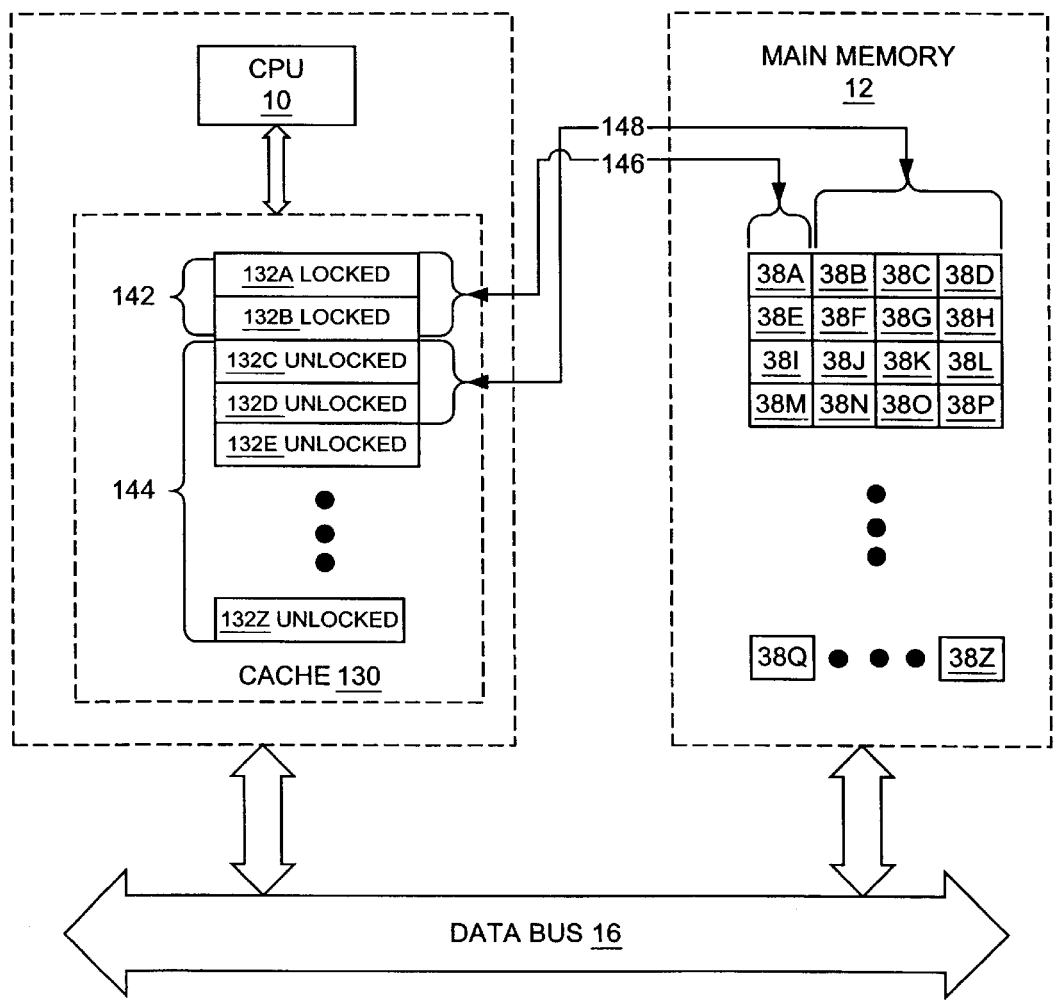
FIG. 7 illustrates a caching mechanism with a locked and an unlocked caching region, in accordance with one or more embodiments of the invention.

A cache may include a locked region (142) and an unlocked region (144), as shown in FIG. 7. Other components shown in FIG. 7 include the CPU (10), the main memory (12), the cache (130), the data bus (16), memory block (38A) through memory block (38Z), and cache line (132A) through cache line (132Z). In accordance with one or more embodiments of the invention, one or more cache lines, for example, cache line (132A) and cache line (132B), of the cache (130) may be locked, while other cache lines, for example, cache line (132C), cache line (132D), cache line (132E), etc., remain unlocked. Thus, locked and unlocked cache lines form one or more locked regions (142) and one or more unlocked regions (144). The locked region (e.g., the locked region (142) that includes cache line (132A) and cache line (132B)) may be used, for example, as local memory for the CPU (10). One skilled in the art will recognize that multiple CPU's (i.e., processors) may be involved in one or more embodiments of the invention.

The locked region (142) stores frequently referenced memory blocks of the main memory (12) or other information, thus making such frequently referenced memory blocks or information available for quick access by the CPU (10) (or, in accordance with one or more embodiments of the invention, multiple CPU's). Locking a cache line prevents information from being swapped out of the cache line in exchange for newly requested information. Therefore, accessing information stored in the locked region (142) is usually predictably fast and devoid of searching or caching overhead.

Figure 8:
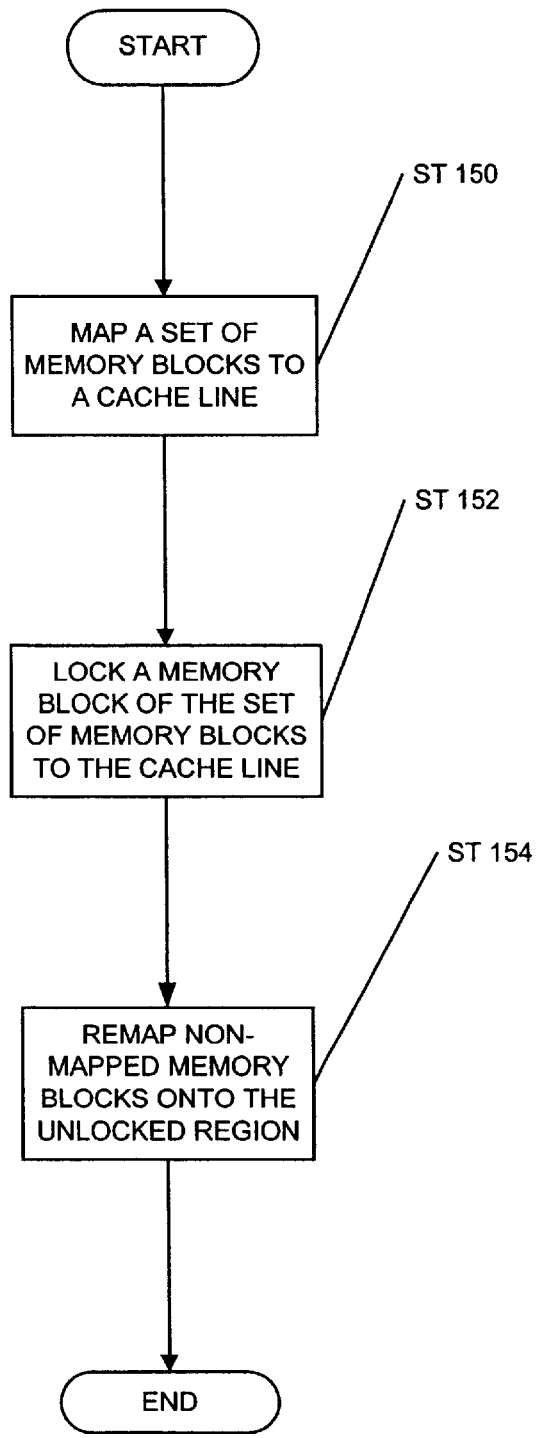
FIG. 8 illustrates a sequence of operations to map and remap memory blocks, in accordance with one or more embodiments of the invention.

In accordance with one or more embodiments of the invention, certain memory blocks that map onto a locked region of a cache may be remapped onto an unlocked region of the cache. FIG. 8 shows a sequence of operations to map and remap memory blocks. A first operation maps a set of memory blocks to a cache line (Step 150). For example, referring to FIG. 7, a set of memory blocks that include memory block (38A) through memory block (38D) may be mapped onto cache line (132A).

However, a particular memory block of the set of memory blocks may be frequently referenced, and thus may be locked onto the cache line (Step 152). For example, memory block (38A) may be frequently referenced, and is therefore locked onto cache line (132A). Locking cache line (132A) makes cache line (132A) unavailable to the other memory blocks, such as memory block (38B) through memory block (38D), for mapping purposes. Thus memory block (38B) through memory block (38D) are non-mapped. Non-mapped memory blocks effectively can no longer be referenced by cache line (132A), at least until cache line (132A) is unlocked, thus producing an undesirable effect (i.e., creation of recurring non-mapping addresses (or holes) in the main memory) and substantially hindering cache hit rate and performance.

In order to reduce or eliminate creation of recurring non-mapping addresses (or holes) in the main memory, non-mapped memory blocks that map onto the locked region (142) of the cache (130) are remapped onto the unlocked region (144) of the cache (130) (Step 154). For example, memory blocks (38B) through (38D) are remapped onto the unlocked cache region (144) of the cache (130), such as cache line (132C) and cache line (132D). Mapping link (146) and mapping link (148) represent mapping associations between the cache (130) and memory blocks, although other mapping associations may exist. Remapping increases associativity of each cache line, meaning that a particular quantity of memory blocks mapped onto a particular individual cache line increases. However, remapping also reduces or eliminates creation of recurring non-mapping addresses (or holes) in the main memory.

In accordance with one or more embodiments of the invention, memory blocks mapped onto the locked region (142) are evenly mapped onto the unlocked region (144). Evenly mapping memory blocks onto the unlocked region (144) is facilitated by, in one or more embodiments of the invention, the unlocked region (144) being a power of two in size. For example, one-eighth, one-fourth, or one-half of the cache (130) remains unlocked and can be used to swap information to and from the main memory (120). As such, the locked region (142) (or locked regions) and the unlocked region (144) (or unlocked regions) can be adjusted in size.

Figure 9:
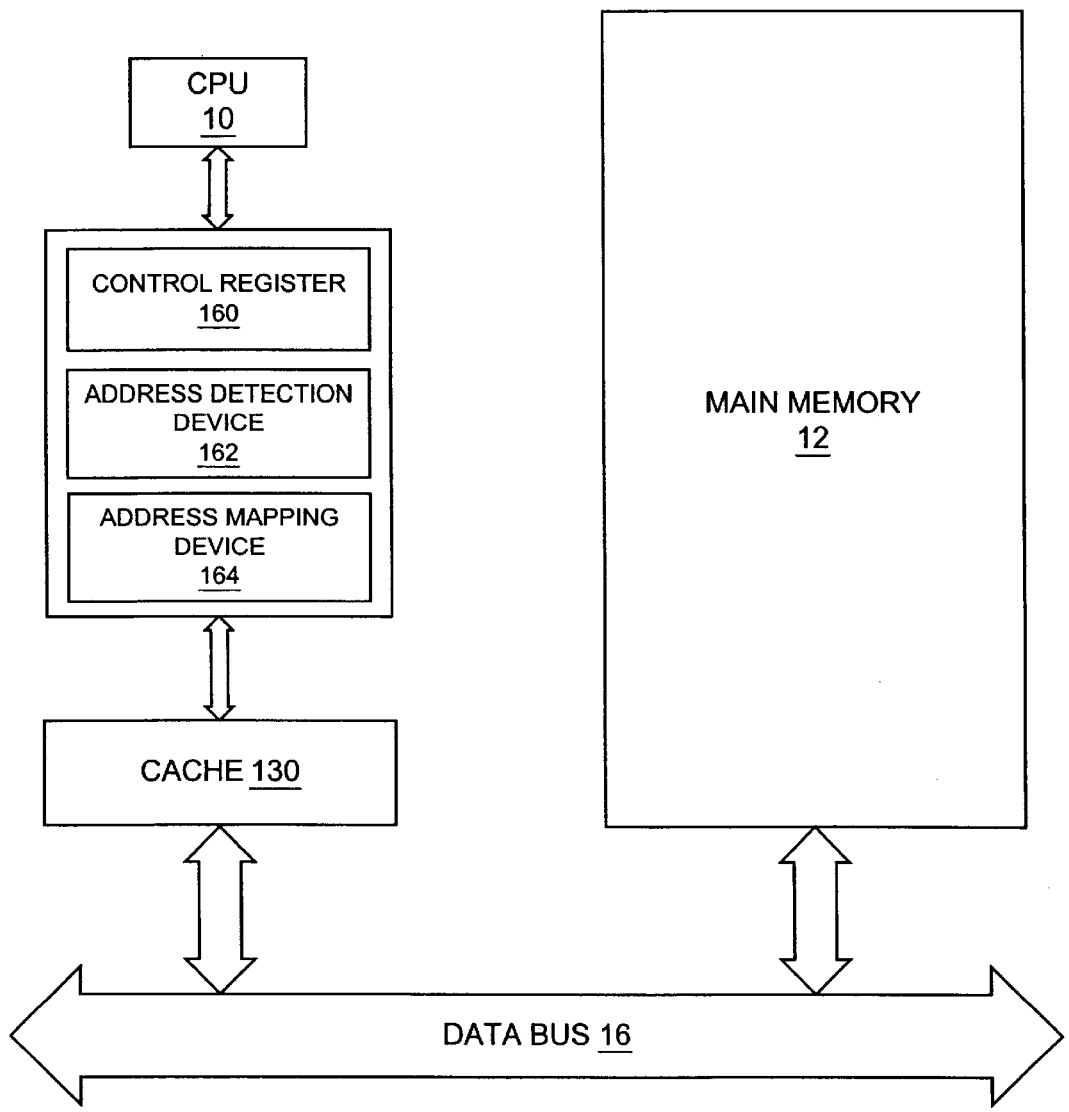
FIG. 9 illustrates entities used in cache management, in accordance with one or more embodiments of the invention.

Size of the unlocked region (144) and the locked region (142) may be adjusted, monitored, and maintained using components as shown in FIG. 9. In accordance with one or more embodiments of the invention, a control register (160) is used to determine the size of the unlocked region (144) in advance of a memory request made by the CPU (10). The control register (160) is in operational relationship with the CPU (10), in accordance with one or more embodiments of the invention. The control register (160) may be implemented as software or hardware. For example, the control register (160) may be a four-bit Cache Control Field stored in a Processor Status Register (PSR). Table 1 is an example of a PSR Cache Control Field defining the size of the unlocked region (144) as shown in FIG. 8, in accordance with one or more embodiments of the invention.

TABLE 1

| Cache Control Field | Size of unlocked portion of cache |
| --- | --- |
| 0000 | 0 bytes |
| 0001 | 256 bytes |
| 0010 | 512 bytes |
| 0011 | 1 KB |
| 0100 | 2 KB |
| 0101 | 4 KB |
| 0110 | 8 KB |
| all others | Reserved |

In one or more embodiments of the invention, the locked region (142) of the cache (130) resides in a lowest portion of the cache (130), and higher portions are dedicated to the unlocked region (144). For example, the locked region (142) of the cache (130) may reside in cache line (132A) through cache line (134B), while the unlocked region (144) resides in a remaining portion of the cache (130). In one or more embodiments, address boundaries can be established, where instead of the lowest portion of the cache (130), a specific region of the cache (130) can be reserved for locking. For example, the locked region (142) of the cache (130) may reside between the cache line (132B) and cache line (132C).

In accordance with one or more embodiments of the invention, cache lines included in the unlocked region (144) of the cache (130) include tag fields. Tag fields denote which of the memory blocks mapped onto a cache line is currently stored therein. Since the locked region (142) and the unlocked region (144) of the cache (130) may vary in size, a tag field width is selected so that the tag field width can support mapping of memory addresses onto the smallest unlocked portion (i.e., a particular cache line) of the cache (130). For example, in one or more embodiments of the invention, the tag field contains sufficient bits to support a cacheable region as small as 256 bytes.

One or more embodiments of the invention include an address detection device (162), which is used to determine whether a memory request is for an address stored within the locked region of the cache (130). If so, a search of the unlocked region of the cache (130) is not necessary. In other embodiments, an address mapping device (164) is used to remap one or more non-mapped memory blocks associated with the locked region to the unlocked region of the cache (130).

Figure 10:
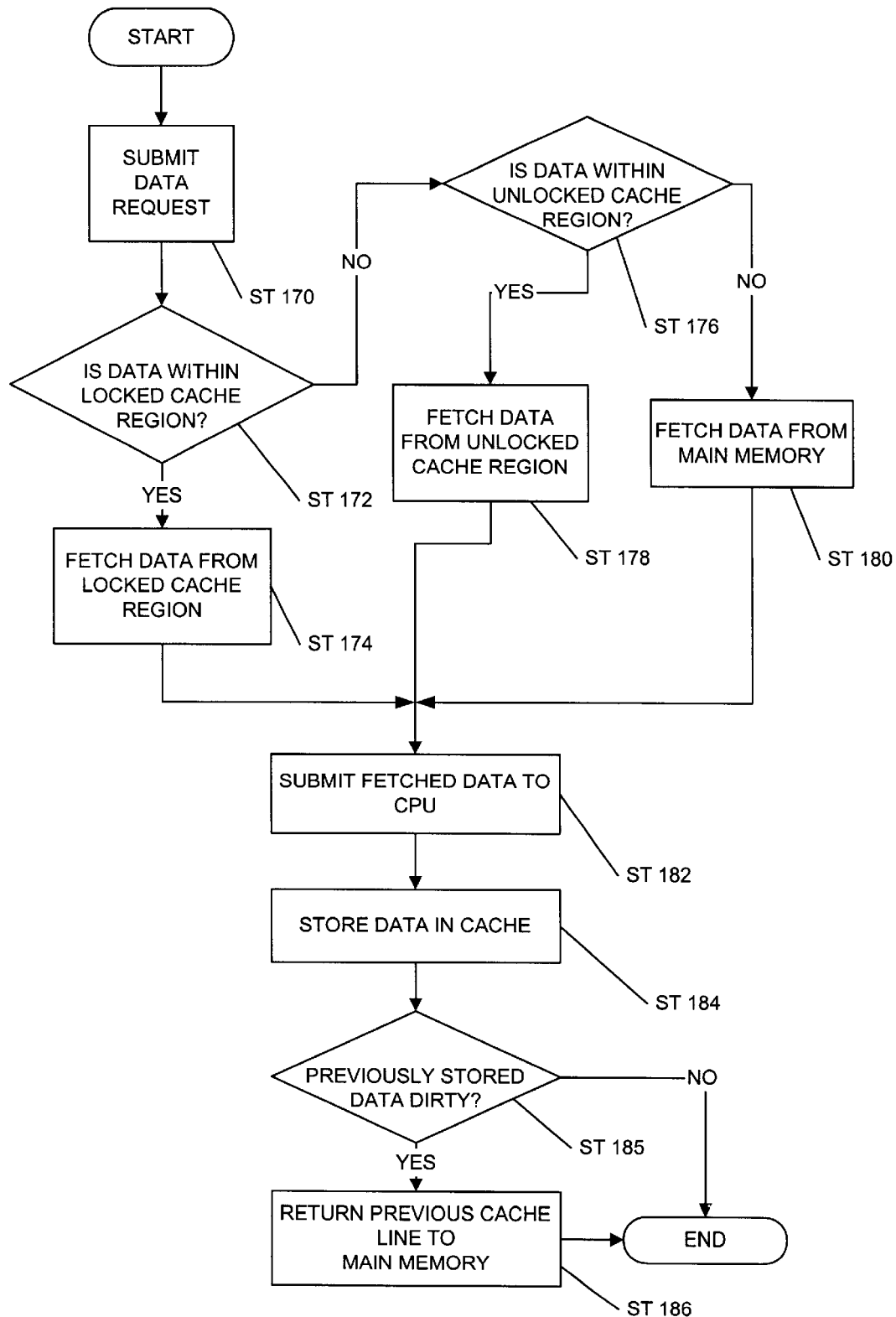
FIG. 10 illustrates a sequence of operations used for cache management, in accordance with one or more embodiments of the invention.

FIG. 10 illustrates a sequence of operations for implementation of one or more embodiments of the invention. A first operation has the CPU submitting a request for data stored in the main memory (Step 170). Then, a determination is made as to whether the requested data is within a memory block that maps to a locked region of the cache (Step 172). In one or more embodiments of the invention, the control register is used for the determination because the control register denotes size of the locked and unlocked regions of the cache.

If the requested data is within the locked region, the requested data is fetched from the locked cache region (Step 174). The requested data is fetched from the locked cache region because a target cache line is predefined and is exclusively associated with the particular memory block in main memory that stores the requested data.

If the requested data is not within the locked cache region, a determination is made as to whether the requested data is available in the unlocked cache region (Step 176). As described earlier, in one or more embodiments of the invention, tag bits are associated with one or more cache lines in the unlocked cache region to identify which mapped memory blocks are residing in a particular cache line, at a certain instant. A cache tag of a referenced cache line may be examined to determine whether the requested data is available therein at Step 176.

If the requested data is within the unlocked cache region, then the requested data is fetched from the unlocked cache region (Step 178). Otherwise, the requested data is fetched from the main memory over the data bus (Step 180). Fetched data is then submitted to the CPU (Step 182). The requested data is stored in a cache line (Step 184), and a determination is made as to whether the previously stored data from the cache line is dirty (Step 185). If the previously stored data from the cache line is dirty, the previously stored data is returned to main memory (Step 186).

Advantages of the present invention include one or more of the following. The invention provides functionality for more efficient cache operation by remapping memory addresses to unlocked regions of the cache in order to prevent creation of non-mapping addresses in main memory. The invention is almost as inexpensive as a direct-mapped cache, while allowing a region of main memory to be locked into the cache, which is a significant advantage for certain specialized processors. Further, the invention is less expensive than a set associative cache, which is a popular solution. Those skilled in the art will realize that the invention may include other advantages and benefits.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of managing data in a cache memory, comprising:
    mapping a member of a plurality of memory addresses in a main memory onto a first member of a plurality of cache lines;
    locking the first member of the plurality of cache lines creating a locked cache region and an unlocked cache region;
    remapping the member of the plurality of memory addresses from the first member of the plurality of cache lines onto a second member of the plurality of cache lines within the unlocked cache region;
    requesting data stored in the main memory;
    fetching the data from the locked cache region, if available in the locked cache region;
    fetching the data from the unlocked cache region, if not available in the locked cache region and available in the unlocked cache region; and
    fetching the data from the main memory, if not available in the locked cache region and not available in the unlocked cache region.

2. The method of claim 1, the locked cache region comprising a lowest address space in the cache memory.

3. The method of claim 1, wherein a size of the locked cache region is adjustable.

4. The method of claim 1, wherein a size of the unlocked cache region is adjustable.

5. The method of claim 1, wherein the data is requested data by a member of a plurality of processors.

6. The method of claim 1, further comprising:
    detecting whether the data is within the unlocked cache region, using a register that maintains a size of the unlocked cache region.

7. The method of claim 1, further comprising:
    associating with the second member of the plurality of cache lines, a tag field to identify information stored in the second member of the plurality of cache lines.

8. The method of claim 7, the tag field comprising a sufficient width to support remapping of the member of the plurality of memory addresses onto a smallest possible portion of the unlocked cache region.

9. A method of managing data in a cache memory, comprising:
    mapping a member of a plurality of memory addresses in a main memory onto a first member of a plurality of cache lines;
    locking the first member of the plurality of cache lines creating a locked cache region and an unlocked cache region;
    remapping the member of the plurality of memory addresses from the first member of the plurality of cache lines onto a second member of the plurality of cache lines within the unlocked cache region;
    requesting data stored in the main memory;
    fetching the data from the locked cache region, if available in the locked cache region;

fetching the data from the unlocked cache region, if not available in the locked cache region and available in the unlocked cache region;

fetching the data from the main memory, if not available in the locked cache region and not available in the unlocked cache region;

detecting whether the data is within the unlocked cache region, using a register that maintains a size of the unlocked cache region; and associating with the second member of the plurality of cache lines, a tag field to identify information stored in the second member of the plurality of cache lines.

10. A cache memory management system, comprising:

a main memory comprising a plurality of memory addresses; and a cache memory comprising a plurality of cache lines, the plurality of cache lines comprising a locked cache region and an unlocked cache region;

wherein a member of the plurality of memory addresses is mapped onto a first member of the plurality of cache lines;

wherein the member of the plurality of memory addresses is configured to remap from the first member of the plurality of cache lines onto a second member of the plurality of cache lines;

wherein the first member of the plurality of cache lines is within the locked cache region, and the second member of the plurality of cache lines is within the unlocked cache region.

11. The cache memory management system of claim 10, the locked cache region comprising the lowest address space in the cache memory.

12. The cache memory management system of claim 10, wherein a size of the locked cache region is adjustable.

13. The cache memory management system of claim 10, wherein a size of the unlocked cache region is adjustable.

14. The cache memory management system of claim 13, further comprising:

a register maintaining a size of the unlocked cache region.

15. The cache memory management system of claim 10, further comprising:

an address detection mechanism configured to detect whether a referenced member of the plurality of memory addresses is within the locked cache region.

16. The cache memory management system of claim 10, further comprising:

a tag field associated with the second member of the plurality of cache lines to identify information stored therein.

17. The cache memory management system of claim 16, the tag field comprising a sufficient width to support remapping the member of the plurality of memory addresses onto the second member of the plurality of cache lines.

18. A cache memory management system, comprising:

a main memory comprising a plurality of memory addresses;

a cache memory comprising a plurality of cache lines, the cache memory comprising a locked cache region and an unlocked cache region;

a register maintaining a size of the unlocked cache region; and an address detection mechanism configured to detect whether a referenced member of the plurality of memory addresses is within the locked cache region;

wherein a member of the plurality of memory addresses is mapped onto a first member of the plurality of cache lines;

wherein the member of the plurality of memory addresses is configured to remap from the first member of the plurality of cache lines onto a second member of the plurality of cache lines;

wherein the first member of the plurality of cache lines is within the locked cache region, and the second member of the plurality of cache lines is within the unlocked cache region.

19. A computer system for managing data in a cache memory, comprising:

a processor;

a memory;

software instructions stored in the memory to cause the computer system to perform:

mapping a member of a plurality of memory addresses in a main memory onto a first member of a plurality of cache lines;

locking the first member of the plurality of cache lines creating a locked cache region and an unlocked cache region;

remapping the member of the plurality of memory addresses from the first member of the plurality of cache lines onto a second member of the plurality of cache lines within the unlocked cache region;

requesting data stored in the main memory;

fetching the data from the locked cache region, if available in the locked cache region;

fetching the data from the unlocked cache region, if not available in the locked cache region and available in the unlocked cache region; and fetching the data from the main memory, if not available in the locked cache region and not available in the unlocked cache region.

20. The computer system of claim 19, the locked cache region comprising a lowest address space in the cache memory.

21. The computer system of claim 19, wherein a size of the locked cache region is adjustable.

22. The computer system of claim 19, wherein a size of the unlocked cache region is adjustable.

23. The computer system of claim 19, wherein the data is requested data by a member of a plurality of processors.

24. The computer system of claim 19, further comprising:

detecting whether the data is within the unlocked cache region, using a register that maintains a size of the unlocked cache region.

25. The computer system of claim 19, further comprising:

associating with the second member of the plurality of cache lines, a tag field to identify information stored in the second member of the plurality of cache lines.

26. The computer system of claim 25, the tag field comprising a sufficient width to support remapping of the member of the plurality of memory addresses onto a smallest possible portion of the unlocked cache region.

27. An apparatus managing data in a cache memory, comprising:

means for mapping a member of a plurality of memory addresses in a main memory onto a first member of a plurality of cache lines;

means for locking the first member of the plurality of cache lines creating a locked cache region and an unlocked cache region;

means for remapping the member of the plurality of memory addresses from the first member of the plurality of cache lines onto a second member of the plurality of cache lines within the unlocked cache region;

means for requesting data stored in the main memory;

means for fetching the data from the locked cache region, if available in the locked cache region;

means for fetching the data from the unlocked cache region, if not available in the locked cache region and available in the unlocked cache region; and means for fetching the data from the main memory, if not available in the locked cache region and not available in the unlocked cache region.

* * * * *